(12) United States Patent
May

(10) Patent No.: US 11,168,872 B2
(45) Date of Patent: Nov. 9, 2021

(54) MOUNTING CLIP FOR NETWORKED LED LIGHTING SYSTEM

(71) Applicant: Michael W. May, Crystal Lake, IL (US)

(72) Inventor: Michael W. May, Crystal Lake, IL (US)

( * ) Notice: Subject to any disclaimer, the term of this patent is extended or adjusted under 35 U.S.C. 154(b) by 47 days.

(21) Appl. No.: 16/191,266

(22) Filed: Nov. 14, 2018

(65) Prior Publication Data

US 2019/0145611 A1    May 16, 2019

Related U.S. Application Data

(60) Provisional application No. 62/586,696, filed on Nov. 15, 2017.

(51) Int. Cl.
| | |
|---|---|
| *F21V 21/088* | (2006.01) |
| *F21V 29/503* | (2015.01) |
| *F21V 29/70* | (2015.01) |
| *H02G 3/32* | (2006.01) |
| *F21S 8/04* | (2006.01) |

(Continued)

(52) U.S. Cl.
CPC .............. *F21V 21/088* (2013.01); *F21S 4/28* (2016.01); *F21S 8/04* (2013.01); *F21S 8/043* (2013.01);
(Continued)

(58) Field of Classification Search
CPC ...... F21V 21/088; F21V 29/503; F21V 29/70; F21V 29/76; F21V 21/02; F21S 4/28;
(Continued)

(56) References Cited

U.S. PATENT DOCUMENTS

| | | | |
|---|---|---|---|
| 8,733,710 B1 * | 5/2014 | Suazo | F21V 21/088 248/74.1 |
| 9,644,828 B1 * | 5/2017 | May | H05B 47/19 |

(Continued)

OTHER PUBLICATIONS

International Search Report and Written Opinion dated Mar. 8, 2019, in corresponding International Patent Application No. PCT/US2018/061196 (16 pgs.).

*Primary Examiner* — Andrew J Coughlin
*Assistant Examiner* — Jessica M Apenteng
(74) *Attorney, Agent, or Firm* — Fitch, Even, Tabin & Flannery LLP

(57) ABSTRACT

A clip for mounting a linear LED lamp to an overhead dropped ceiling grid or to a planar support surface. The mounting clip has a pair of spaced resilient fingers extending downwardly and defining an interior region between the fingers sized to receive a portion of the linear LED lamp heat sink. Each finger has an internally facing engagement portion comprising protrusions configured to interlock with one or more external ridges of the heat sink of a linear LED lamp to securely retain the linear LED lamp between the fingers. In one form, the mounting clip has upper tab portions configured to engage and connect to a horizontally extending ledge of a channel member of the overhead dropped ceiling grid. In another form, the mounting clip is adapted to be secured to a planar support by means of a mechanical fastener or magnetically. The disclosed mounting clip can also be configured to secure a network cable to the lower surface of a ceiling or other support surface so that the cable can be routed from a network switch or other control equipment to the individual linear LED lamps or from one lamp to another in an automated POE lighting system.

10 Claims, 6 Drawing Sheets

(51) Int. Cl.
*F21S 4/28* (2016.01)
*F21V 29/76* (2015.01)
*F21V 21/02* (2006.01)
*F21Y 115/10* (2016.01)

(52) U.S. Cl.
CPC ............ *F21V 21/02* (2013.01); *F21V 29/503* (2015.01); *F21V 29/70* (2015.01); *F21V 29/76* (2015.01); *H02G 3/32* (2013.01); *F21Y 2115/10* (2016.08)

(58) Field of Classification Search
CPC .... F21S 8/04; F21S 8/043; H02G 3/32; F21Y 2115/10
USPC ........................................................ 362/147
See application file for complete search history.

(56) References Cited

U.S. PATENT DOCUMENTS

| | | |
|---|---|---|
| 9,671,072 B1 | 6/2017 | May |
| 2003/0103347 A1 | 6/2003 | Friend |
| 2009/0109670 A1 | 4/2009 | Boyer |
| 2010/0254146 A1* | 10/2010 | McCanless ........... F21V 21/088 362/368 |
| 2011/0317435 A1* | 12/2011 | Wang .................... F21V 21/025 362/370 |
| 2012/0250309 A1 | 10/2012 | Handsaker |
| 2013/0094225 A1 | 4/2013 | Leichner |
| 2016/0195225 A1 | 7/2016 | Carney |
| 2017/0198872 A1* | 7/2017 | Sonneman ........... F21V 23/003 |
| 2017/0198896 A1 | 7/2017 | May |

* cited by examiner

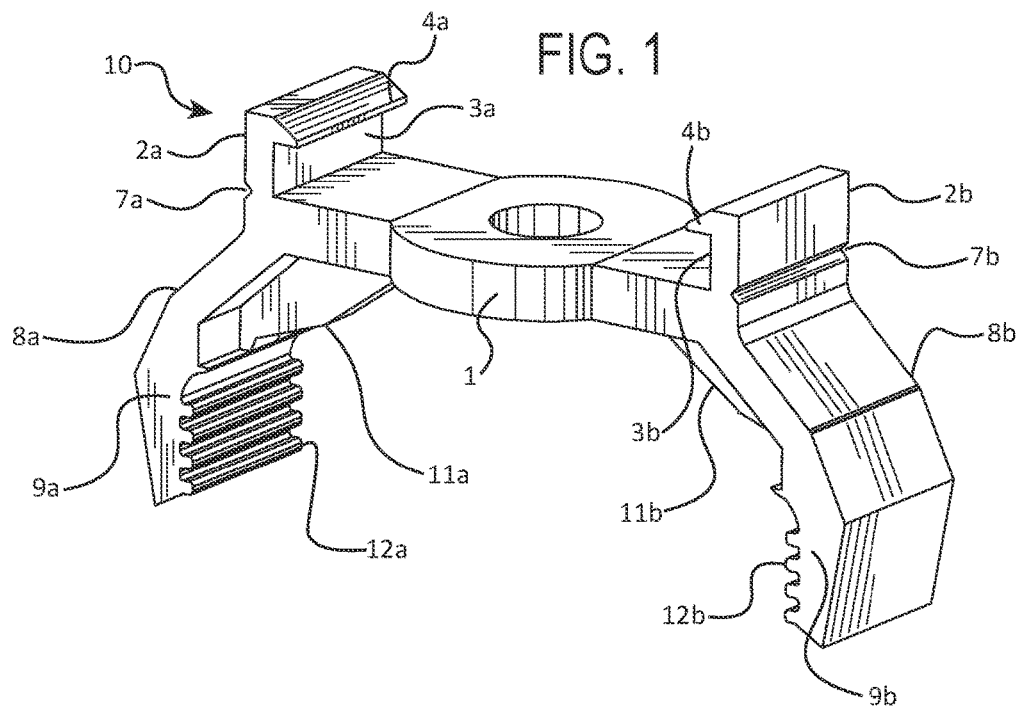
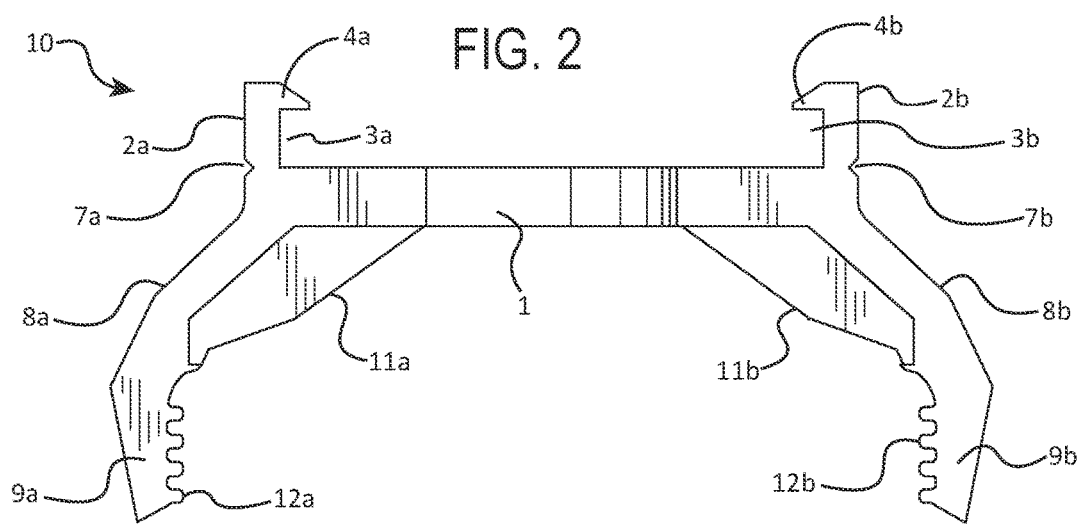

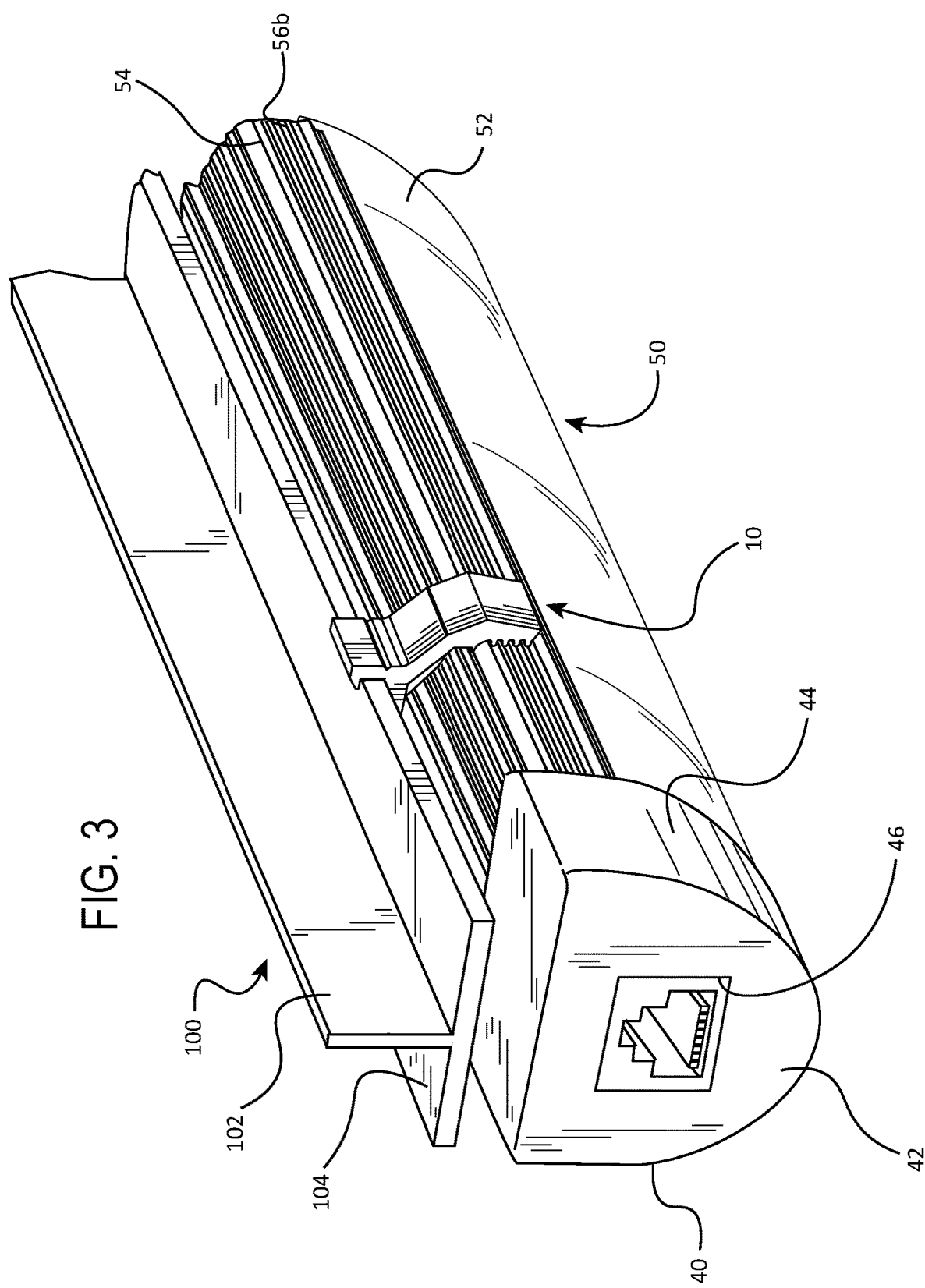

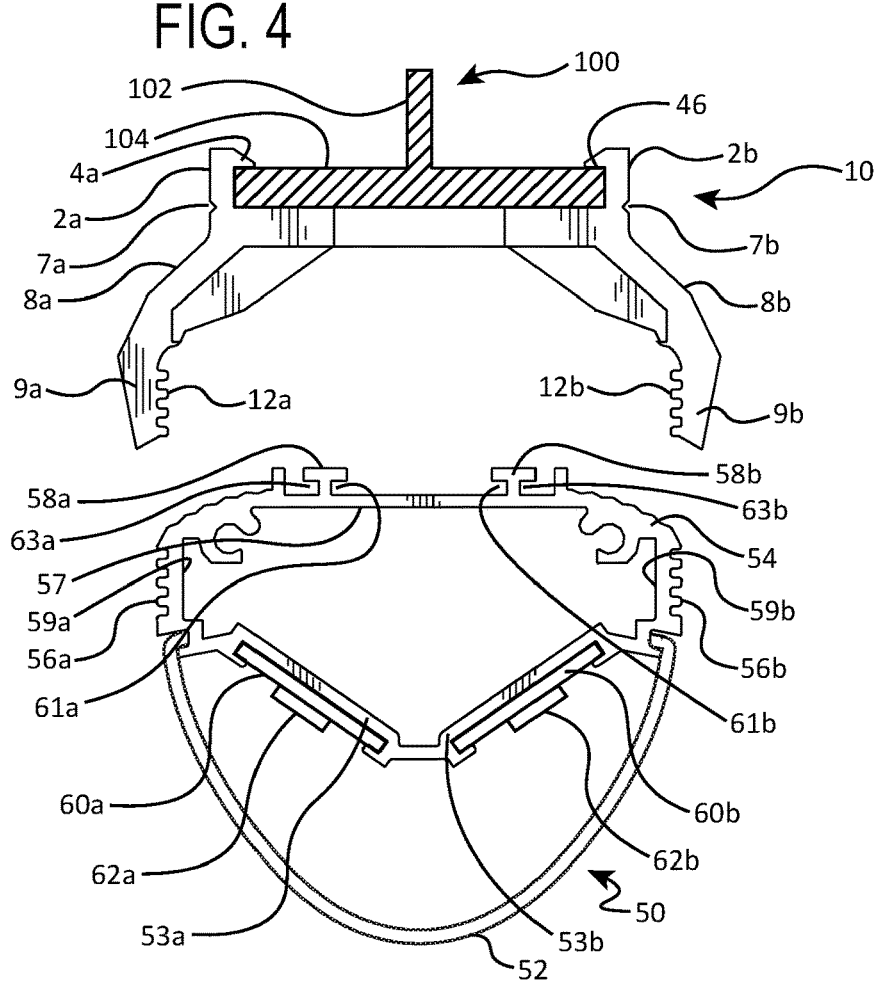
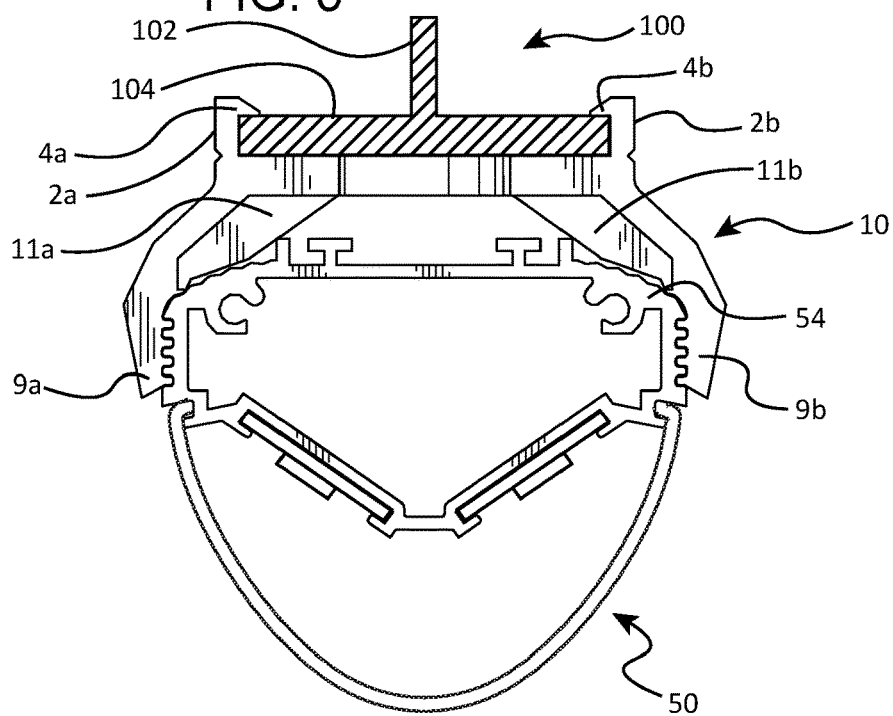

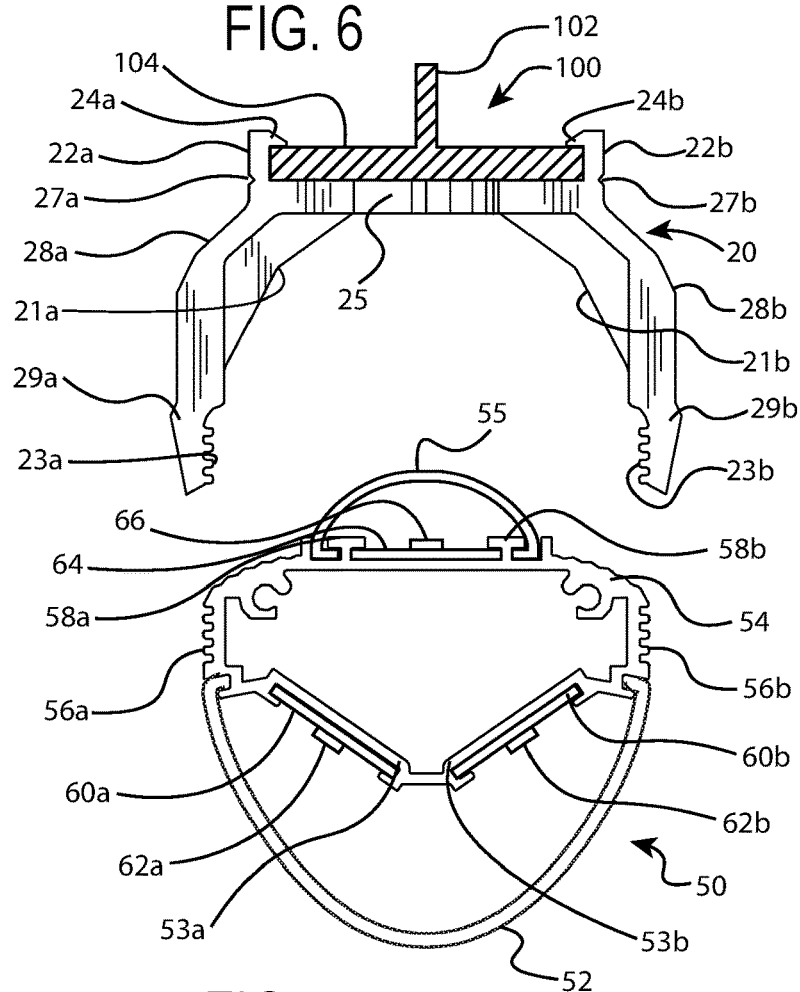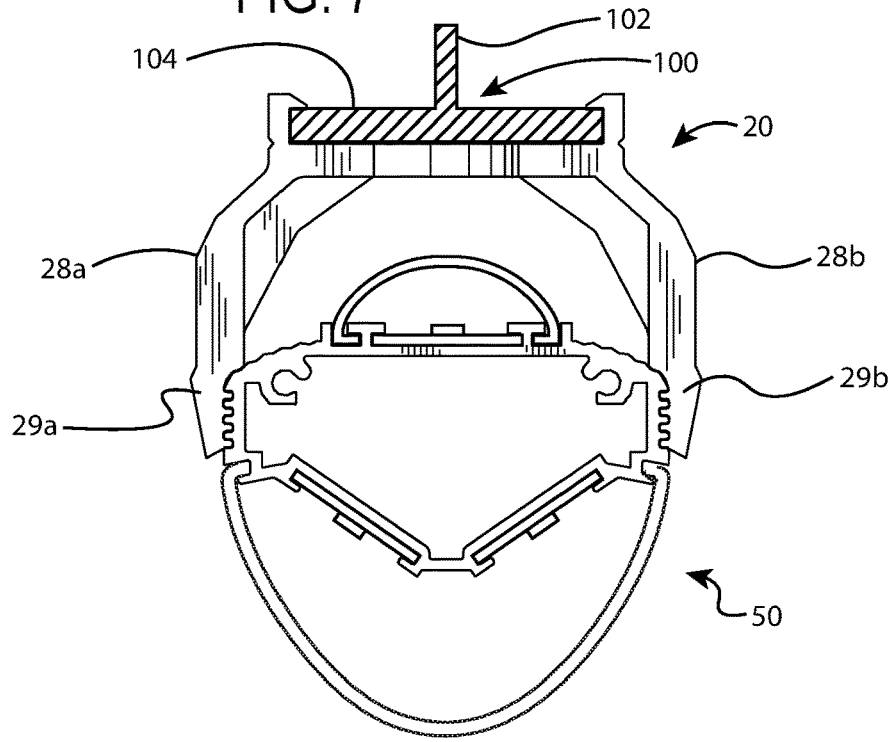

MOUNTING CLIP FOR NETWORKED LED LIGHTING SYSTEM

CROSS-REFERENCE TO RELATED APPLICATION

This application claims the benefit of U.S. Provisional Application No. 62/586,696, filed Nov. 15, 2017, which is incorporated by reference in its entirety herein.

FIELD

This invention relates to lighting and, more particularly, to light emitting diode (LED) illumination as well as tubular lighting assemblies adapted for networked lighting systems.

BACKGROUND

An improved LED lighting system comprising elongated linear lamps having an LED luminary as a source of illumination and configured to operate as a node of an automated networked lighting system is disclosed in U.S. Patent Application Publication No. 2017-0227174 A1, by the same applicant of the subject application, and is incorporated by reference as if reproduced in its entirety herein. The linear LED lamps have internal modular network connectors and control components so that they can receive control data and power signals over a single network cable according to a standardized power and data network communications architecture such as Ethernet. In one form, a clipping mechanism is provided for mounting linear networkable LED lamps to an overhead grid ceiling system.

Alternative mounting systems for securing a linear LED lamp to an overhead grid ceiling system, linear lighting fixture, or other support surface are disclosed herein. The present disclosure also includes novel mounting systems for securing a length of network cable to the underside of an overhead ceiling or other surface to facilitate network cable connections between the installed linear LED lamps and other components of a networked lighting system.

BRIEF DESCRIPTION OF THE DRAWINGS

FIG. 1 is a perspective view of a mounting clip for securing a linear LED lamp to a ceiling grid.

FIG. 2 is a perspective end view of the mounting clip of FIG. 1.

FIG. 3 is a perspective view showing a mounting clip and a network compatible linear LED lamp joined to a cross member of a ceiling grid of a suspension ceiling system.

FIG. 4 is a perspective end view showing the heat sink of the linear LED lamp of FIG. 3 with the lamp end cap removed, and a mounting clip for securing the end cap and lamp to a ceiling grid.

FIG. 5 is a view of the components of FIG. 4, with the mounting clip and heat sink joined in an assembled configuration.

FIG. 6 is a perspective end view showing the heat sink of an alternative linear LED lamp embodiment with the lamp end cap removed, and an alternate mounting clip for securing the heat sink of the lamp to a ceiling grid.

FIG. 7 is a view of the components of FIG. 6, with the mounting clip and heat sink joined in an assembled configuration.

DESCRIPTION OF THE PREFERRED EMBODIMENTS

Figure 8:
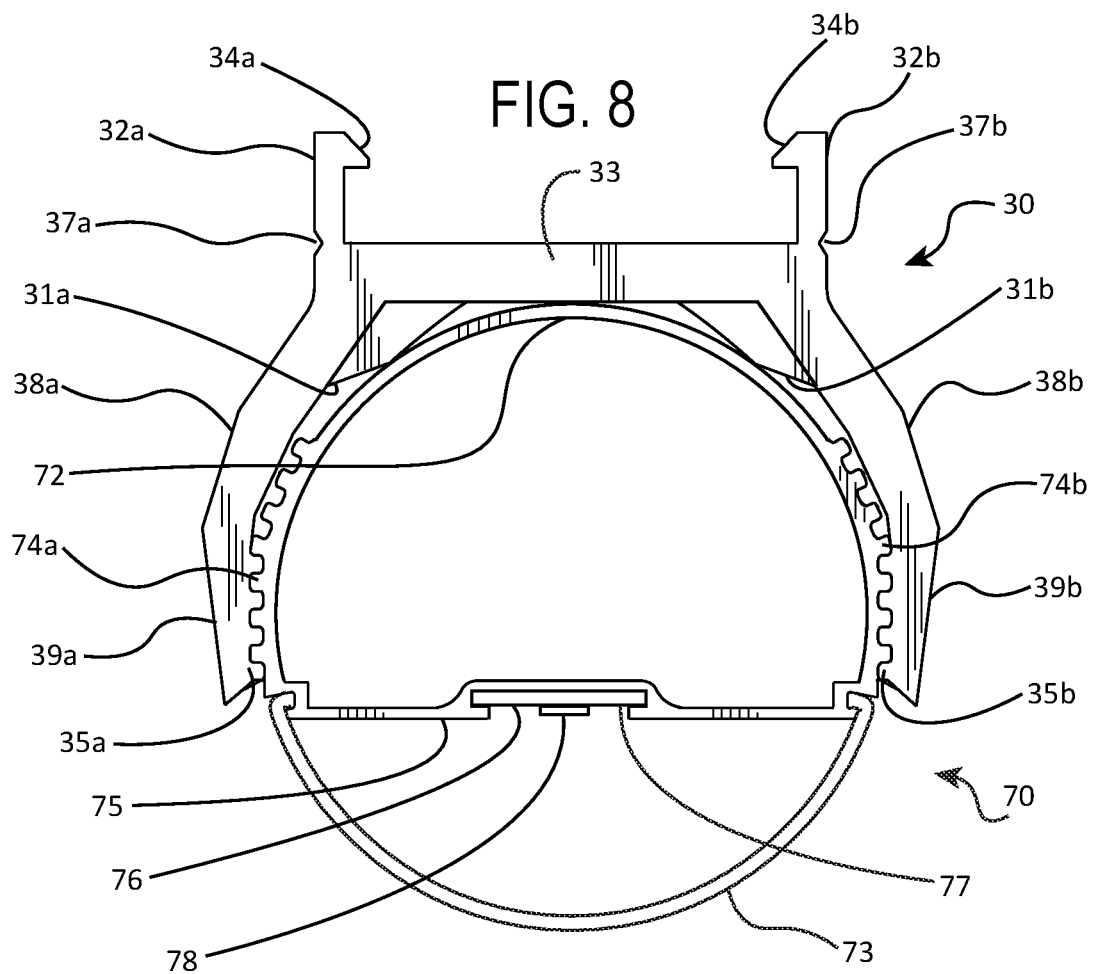
FIG. 8 is a perspective end view showing a generally cylindrical linear LED lamp with the lamp end cap removed, and an alternate mounting clip for securing the heat sink of the lamp to a ceiling grid, joined in an assembled configuration.

For the purposes of promoting an understanding of the principles of the invention, reference will now be made to the embodiments illustrated in the drawings and specific language will be used to describe the same. It will nevertheless be understood that no limitation of the scope of the invention is thereby intended. Any such alterations and further modifications in the illustrated devices, and such further applications of the principles of the invention as illustrated herein are contemplated as would normally occur to one skilled in the art to which the invention relates.

In one aspect, a network enabled linear LED lamp adapted to be mounted directly to a ceiling grid is disclosed, together with a novel mounting clips for securing the lamp to an overhead ceiling grid. FIG. 3 shows a perspective view of a linear LED lamp 50 having an external heat sink 54 extending over a portion of the perimeter of an elongate body portion, and having end cap assembly 40 at a first end of the body. The lamp has a generally U-shaped cross-sectional profile. End cap assembly 40 houses Ethernet jack 46, which is positioned so that its receptacle opens laterally through an opening in the end wall 42 of the end cap assembly. This configuration permits a standard Ethernet cable plug to insert directly into the jack using a lateral approach along the direction of the length of the lamp for communicating power and data between a computer network and internal components of the lamp.

FIG. 4 shows an end view of the lamp 50 with end cap assembly 40 removed. The heat sink 54 of the illustrated lamp 50 is multi-sided with a generally trapezoidal cross-sectional geometry in a plane perpendicular to the length of the lamp body. A first side 57 extends generally horizontally forming the upper surface of the lamp body in the installed configuration. Sidewalls 59a, 59b extend generally vertically from the first side 57, and may include external fins or ridges 56a, 56b to improve heat dissipation. Angled fourth and fifth sidewalls 53a, 53b provide mounting surfaces for supporting emitter panels 60a, 60b in a V-orientation such that LEDs 62a, 62b arranged along the length of the emitter panels distribute light generally downward and laterally over a wide area. A generally V-shaped or U-shaped transparent or translucent lens 52 removably attaches to the heat sink by inward projecting flanges that engage and seat with external grooves at opposite right and left corners of the heat sink. As shown in FIG. 3, end cap assembly 40 has a corresponding shape in a plane perpendicular to the length of the body. The lamp end extends into a receptacle formed by the sidewalls 44 of the end cap assembly. The end cap at the opposite end of lamp 50, not shown, may be of a similar structure and may include a comparable jack (not shown) also orientated such that its receptacle opens laterally through an opening in its end wall. Alternatively, the jacks may be positioned to open through a sidewall of the end cap assemblies.

As is known to those skilled in the art, a dropped ceiling is a secondary ceiling hung below the main structural ceiling. Drop ceilings are common in both residential and commercial buildings. They advantageously hide the building infrastructure, including piping, wiring, sprinkler systems and/or ductwork, by creating a plenum space above the dropped ceiling, while allowing access for repairs and inspections. Other advantages include improved room acoustics and thermal energy insulation. A typical dropped ceiling consists of a grid-work of metal channels in the shape of an upside-down "T", suspended on wires from the overhead structure. These channels snap together in a regularly spaced pattern of cells. Each cell is then filled with lightweight ceiling tiles or "panels" which simply drop into the grid. Standard cell sizes may vary by region. In the United States, for example, the cell size in the suspension grids is typically either 2 ft×2 ft or 2 ft×4 ft and the ceiling tiles are the same size. In Europe the cell size in the suspension grids is 600×600 mm, while the ceiling tiles are slightly smaller. An older, less common type of dropped ceiling is the concealed grid system, in which panels are interlocked to each other and the grid with the use of small strips of metal called "splines". Normally, these type of ceilings will have a "key panel" which can be removed, allowing for the other panels to be slid out of the grid.

FIG. 3 illustrates the direct mounting of linear LED lamp 50 to a ceiling grid using a novel clip mounting system disclosed herein. The lamp is shown suspending from metal channel 100 of a drop ceiling grid. The channel 100 includes horizontally extending ledge 104 and vertically extending divider 102, as is typical of the upside down T channels suspended by wires, cables or other means from the overhead structure. A first end of lamp 50 is mounted to channel 100 by a mounting clip 10 having a first upper portion that snap clamps on the ledge 104 of channel 100 and a second lower portion that holds the heat sink 54 of the lamp. Although not shown in the figure, a second substantially identical clip secures the opposite end of the lamp to the ceiling grid. Additional mounting clips may be used as desired.

FIGS. 1 and 2 illustrate mounting clip 10 in more detail. The mounting clip 10 is preferably formed of a plastic material having a high yield strength that allows it to be deformed and return to its original shape. It has an upper clip portion comprising a pair of resilient tabs 2a, 2b extending upwardly from opposite ends of horizontally extending mid-portion 1. The tabs 2a, 2b function to grasp ledge 104 to secure the mounting clip 10 to ceiling grid channel 100. Tabs 2a, 2b include flanges 4a, 4b, respectively, which project inward toward each other and are configured to oppose the upper surface ledge 104 at the outer edge portions thereof when mounting clip 10 is joined to channel 100. The mid-portion 1 and flanges 4a, 4b define slots 3a, 3b, respectively, sized to receive opposite outer edge portions of ledge 104. In one aspect, the outer sidewalls of tabs 2a, 2b may define grooves 7a, 7b respectively, as shown. The thinner wall thickness at the grooves reduces the force necessary to deflect the tabs 2a, 2b outwardly to an expanded orientation. The flanges 4a, 4b have respective ramped upper surfaces as shown. To secure the mounting clip 10 to the channel 100, the clip may be moved upward so that the ramped surfaces engage the outer edge portions of the ledge 104, forcing the resilient tabs 2a, 2b to deflect outward from their relaxed shape into an expanded orientation so that mid-portion 1 may be moved upward against the lower facing surface of ledge 104. Once the ramped surfaces of the tabs clear the ledge 104, the tabs are released and return to their relaxed shape with ledge 104 of channel 100 residing in slots 3a, 3b between the tabs, and the lower surfaces of flanges 4a, 4b opposing the upper facing surface of the ledge 104. This maintains a secure connection between the opposed surfaces of the tabs and the ledge.

FIG. 4 shows a perspective end view of mounting clip 10 in an installed configuration joined to channel 100 of a ceiling grid. The position of the mounting clip is easily adjusted by sliding it along the length of the channel 100. The mounting clip 10 may be removed from the channel by manually manipulating one or both of tabs 2a, 2b to its expanded position so that the clip can be moved downward and separated from the channel. FIGS. 4 and 5 also show a view of lamp 50 facing a first end of its heat sink 54. The lamp end cap assembly 40 is not shown in order to better illustrate the interaction between mounting clip 10 and the heat sink 54.

As shown in FIGS. 1-5, a pair of fingers 8a, 8b extend from the mid-portion 1. The fingers extend downward and outward at an angle from mid-portion 1 and include respective distal tip portions 9a, 9b that extend generally perpendicular to the mid-portion 1. Ribs 11a, 11b extend at an angle from mid-portion 1 along inner surfaces of the respective fingers 8a, 8b. The distal tip portions 9a, 9b include inward facing engagement surfaces provided with protrusions 12a, 12b, respectively, which are configured to mate with external fins of the lamp heat sink 54. As is illustrated in FIGS. 4 and 5, the fingers define an interior space between the opposite fingers sized to receive an upper portion of heat sink 54. Thus, with mounting clip 10 secured to the ceiling grid channel 100, the lamp 50 may be joined to the mounting clip 10 by moving the lamp upward so that heat sink 54 engages the distal tip portions 9a, 9b of fingers 8a, 8b. The engagement between the outer surfaces of sidewalls 59a, 59b of the heat sink and the distal tip portions 9a, 9b of the fingers causes the fingers to slightly deflect outwardly to an expanded assembly configuration so that outer surfaces of the heat sink can slide upwardly past the opposed surfaces of the distal tip portions and into a fully engaged position. The spring force of each finger presses the finger inwardly against the outer surface of the heat sink.

With the lamp heat sink 54 and mounting clip 10 in the fully engaged configuration shown in FIG. 5, the distal tip portions 9a, 9b of fingers 8a, 8b firmly grasp the heat sink with the protrusions 12a, 12b interlocked with external fins 56a, 56b of the heat sink, preventing the heat sink from detaching from the mounting clip during normal operation of the lamp. The ribs 11a, 11b add structural support to and increase the rigidity of fingers 8a, 8b so that significant force is required to deform the fingers away from each other into an expanded position. The connection made between the lamp 50 the mounting clip 10 is therefore quite secure and can withstand forces caused by normal building vibrations, sudden impact by an object, or even earthquake or other emergency conditions. However, when it is desired to remove the lamp 10 from the mounting clip 10, this is easily accomplished by manually deflecting one or both of the distal tip portions 9a, 9b to an expanded configuration to release the engagement between the protrusions 12a, 12b and external fins 56a, 56b, and pulling the lamp out from between the fingers.

The opposite end of lamp 50 may be secured to the ceiling grid using a second such clip in the same manner. It may be desirable to position one or more additional clips at intermediate locations along the length of the heat sink, depending on the weight and length of the lamp.

The mounting clip 10 may also advantageously provide a self-locking mechanism, which is explained as follows. Once installed on ceiling grid channel 100 as described above, and prior to being mated with a corresponding linear LED lamp, mounting clip 10 may be freely translated along the length of the channel 100 to maneuver it to its desired final location. Slots 3a, 3b of the tabs 2a, 2b of the mounting clip 10 are sized relative to the dimensions of the ledge 104 so that there is sufficient clearance between the opposed surfaces to permit this sliding engagement with the ledge 104. When the linear LED lamp 10 is moved upward into the space between the opposed fingers 8a, 8b as shown in FIG. 5, the outward deflection of the fingers resulting from the outer surfaces of heat sink sidewalls 59a, 59b engaging the inner surfaces of distal tip portions 9a, 9b causes tabs 2a, 2b to rotate slightly inwardly towards each other. This rotation increases the generally downward forces imparted by flanges 4a, 4b on the upper facing surface of ledge 104 as well as the generally horizontal forces imparted by the slotted inner surfaces of tabs 2a, 2b on the side edges of ledge 104, thus securing mounting clip 10 more firmly to the ledge 104 and minimizing further translation of the mounting clip along the length of channel 100 after the lamp is installed. The mounting clip 10 may be conveniently repositioned as desired by first decoupling linear LED lamp 50 from the mounting clip, sliding the clip along ledge 104 to its desired location (or removing and reattaching the mounting clip), followed by reinstalling the lamp into the repositioned clip.

The disclosed mounting clip may be provided in different shapes adapted to the particular outer geometry of the linear LED lamp. As another example, FIGS. 6 and 7 illustrate one such alternative mounting clip adapted to hold a modified version of lamp 50 having an additional upward facing LED emitter board and lens for casting light generally upward. FIGS. 6 and 7 show the modified lamp 50 from an end view with the end cap removed. The structure of the lamp heat sink 54 is identical to that of the lamp 50 depicted in FIGS. 1-5 as described herein. Therefore, common components are given the same reference numbers in FIGS. 6 and 7, and the description of their structure and functions is not repeated.

As shown in FIGS. 6 and 7, mounting rails 58a, 58b extend longitudinally and generally parallel to each other along the length of heat sink 54 and define a mounting portion on the upper surface of sidewall 57 extending between them. Each rail has a generally T-shape cross-section forming a pair of internal grooves 61a, 61b and a pair of external grooves 63a, 63b (see FIG. 4). The internal grooves 61a, 61b are configured to receive opposite side edge portions of LED emitter board 64 having one or more strings of LED emitters 66. The emitter board 64 may be secured to the mounting portion by sliding it along the length of lamp body and into engagement with the internal grooves 61a, 61b. A convexly shaped transparent or translucent lens 55 removably attaches to the heat sink by inward projecting flanges that engage and seat with the external grooves 63a, 63b at opposite lateral sides of the mounting rails 58a, 58b.

The modified lamp 50 illustrated in FIGS. 6 and 7 is configured to be installed in an overhead lighting system oriented so that the LED emitter boards 60a and 60b are directed generally downward to cast light downward and laterally over a broad area of the space below. In this installed configuration, the third emitter board 64 is operable to cast a separate beam of light upwardly into the space above the lamp. The LED emitters 66 may be of the same or different color and other characteristics as the emitters of the downward directed emitter boards. An internal control module can be configured to control the emitter board independent of the other emitter boards so that the intensity, color characteristics, etc. of the upward directed light may be adjusted independently to provide the desired lighting effects.

The mounting clip may be provided in an alternative form to accommodate such a lamp, as is illustrated as mounting clip 20 in FIGS. 6 and 7. Mounting clip 20 is of the same overall design and operates essentially the same as the previously described mounting clip 10, except that its fingers 28a, 28b extend further in the vertical direction to provide a vertically expanded space for receiving the modified lamp 50. Thus, similar to the previously described embodiment, mounting clip 20 comprises an upper clip portion having a pair of resilient tabs 24a, 24b extending upwardly from opposite ends of horizontally extending mid-portion 25, and defining slots sized to receive opposite outer edge portions of ledge 104. Inward projecting ramped flanges 24a, 24b of the tabs are configured to oppose the upper surface ledge 104 at the outer edge portions thereof when mounting clip 20 is joined to channel 100. The outer sidewalls of tabs 24a, 24b may define grooves 27a, 27b respectively to facilitate outward deflection of the tabs as the mounting clip 20 is moved upward against the ledge 104 of channel 100. The mounting clip 20 is secured to the channel 100 in the same manner as previously described with respect to mounting clip 10.

Fingers 28a, 28b have a first portion that extends outward at an angle from mid-portion 25 and a second portion that extends generally downward to respective distal tip portions 29a, 29b. The downward extending portions are of increased length compared to the fingers 8a, 8b of mounting clip 10 to accommodate the lens 55. Ribs 21a, 21b extend from mid-portion 25 along inner surface of respective fingers 28a, 28b. The distal tip portions 29a, 29b include inward facing engagement surfaces provided with protrusions 23a, 23b, respectively, which are configured to mate with external fins 56a, 56b of the lamp heat sink 54 as the lamp is moved upward into the interior space between the opposed fingers, as shown in FIG. 7.

The disclosed mounting clips may also be adapted for use with linear LED lamps of other geometries by modifying the profile of the fingers to correspond with the outer profile of the lamp heat sink. As one example, FIG. 8 illustrates another embodiment depicted as mounting clip 30, which is adapted for mounting a cylindrical linear LED lamp 70. The lamp 70 is shown from an end view in FIG. 8 with its end cap assembly removed. The lamp 70 includes heat sink 72 having an upper portion of a generally semi-circular cross-sectional configuration and a lower portion comprising horizontally extending sidewall 75. The sidewall 75 includes a central mounting channel 77 for mounting LED emitter board 76, which has a series of LED emitters 78 directed downward when the lamp is installed in an overhead lighting system. A convexly shaped transparent or translucent lens 73 removably attaches to the heat sink by inward projecting flanges that engage and seat with the external grooves at opposite lower lateral corners of the heat sink 72 as shown.

Mounting clip 30 is of the same overall design and operates essentially the same as the previously described mounting clip 10, except that its fingers 38a, 38b are shaped to receive the generally cylindrical heat sink 72 of lamp 70. The upper portion of mounting clip 30 is generally the same as that of the previous embodiments described above and operates in the same manner to couple the clip to a ceiling grid. Thus, similar to the previously described embodiments, mounting clip 30 comprises a pair of resilient tabs 32a, 32b extending upwardly from opposite ends of horizontally extending mid-portion 33, and defining slots sized to receive opposite outer edge portions of the ledge of a ceiling grid channel. Inward projecting ramped flanges 34a, 34b of the tabs are configured to oppose the upper surface ledge at the outer edge portions thereof when mounting clip 20 is joined to the channel. The outer sidewalls of tabs 34a, 34b may define grooves 37a, 37b respectively to facilitate outward deflection of the tabs as the mounting clip 30 is moved upward against the ledge of the channel. The mounting clip 30 is secured to the channel in the same manner as previously described with respect to mounting clip 10.

Fingers 38a, 38b extend downward and outward from mid-portion 33 at a predetermined angle chosen to accommodate the shape of heat sink 72 and extend to distal tip portions 39a, 39b. Ribs 31a, 31b extend from mid-portion 33 along an inner surfaces of a respective finger 38a, 38b. The distal tip portions 39a, 39b include inward facing engagement surfaces provided with protrusions 35a, 35b, respectively, which are configured to mate with external fins 74a, 74b on opposite sides of the lamp heat sink 72 as the lamp is moved upward into the interior space between the opposed fingers, as shown in FIG. 8.

Mounting clips made in accordance with the disclose invention may also be adapted for applications where it is desired to secure a linear LED lamp to surfaces other than the lower surface of an overhead ceiling grid. These other applications may include, for example, mounting linear LED lamps directly to a wallboard ceiling, to a tacked ceiling, below cabinetry, or to a vertical wall. Another important application involves mounting linear LED lamps directly to an existing lighting fixture or as a removeable and replaceable component of a new lighting fixture. This application is of particular significance because it allows for separation between the design and manufacture of the light fixtures, on the one hand, and modular lamps, on the other hand.

Figure 9:
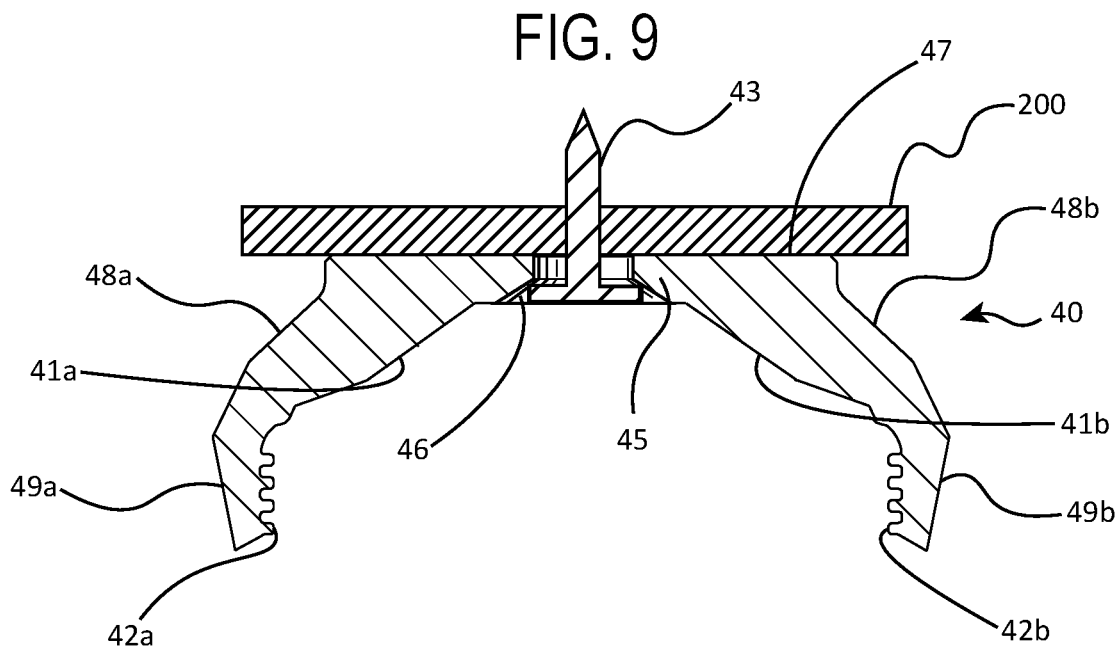
FIG. 9 is a cross-sectional view of a mounting clip for a linear LED lamp adapted to be mounted to a support surface by means of a separate fastener.

FIG. 9 provides a cross-sectional view taken through a vertical mid-plane of an exemplary mounting clip that may be conveniently used in such applications. The mounting clip 40 illustrated in FIG. 9 is similar to mounting clip 10 of FIG. 1 except that the upward projecting tabs 2a, 2b have been eliminated so that the clip may be flush mounted directly to any flat support surface. As shown, mid-portion 45 has a generally planar upper facing surface 47 that can be mounted against the lower surface of a support 200. The support 200 may be any generally planar surface that is capable of supporting the weight of a linear LED lamp. The mid-portion 45 defines a central aperture 46 for receiving fastener 43 used to couple mounting clip 40 to support 200. As an alternative to a mechanical fastener, the mounting clip may include one or more magnets integrated into the mid-portion thereof to force the clip against any metal support.

The remainder of mounting clip 30 is of the same overall design and operates essentially the same as the previously described mounting clip 10 to grasp and firmly hold a portion of a linear LED lamp. Fingers 48a, 48b extend downward and outward from mid-portion 45 at a predetermined angle and with a contour chosen to accommodate the shape of the heat sink of the lamp to be mounted in the clip. The fingers extend to distal tip portions 49a, 49b. Ribs 41a, 41b extend from mid-portion 45 along an inner surfaces of a respective finger 48a, 48b. The distal tip portions 49a, 49b include inward facing engagement surfaces provided with protrusions 42a, 42b, respectively, which are configured to mate with external fins of the lamp heat sink as the lamp is moved upward into the interior space between the opposed fingers.

The mounting clips described herein provide the flexibility to arrange the linear LED lamps of a particular lighting system as desired to provide efficient lighting that meets the characteristics and needs of each application. Various control, sensor and computing devices may be included in such a lighting system to achieve desired objectives, and the centralized control system may connect to individual lamps using a variety of network configurations, including the branch chain configuration shown, direct hub and spoke connections to individual lamps, or any other network configuration. As discussed above, the lamps may be equipped with network enabled jacks and associated electronic components at one or both ends to support the desired network architecture and automated lighting functionality.

A networked linear lamp based LED lighting system consisting of individual lamps mounted directly to an overhead ceiling offers certain advantages. Building and safety codes govern various aspects of the wiring, electrical equipment and other devices installed in the space above a dropped ceiling. New wiring must be routed in a way that will not interfere with existing equipment, and any installation into this space must comply with all regulations and will normally require the building owner to obtain a new inspection to certify compliance. The disclosed network compatible linear LED lamps allow the entire system to be installed below the ceiling without altering the space above. The installation process involves simply attaching the mounting clips to the ceiling at the desired locations, securing the LED lamps to the clips, and then connecting the lamps to the network using standard network cables. Setting up the centralized control equipment involves routine plug-and-play steps comparable to connecting peripherals to a personal computer, mostly involving plugging cables into corresponding jacks and turning on power switches.

Figure 10:
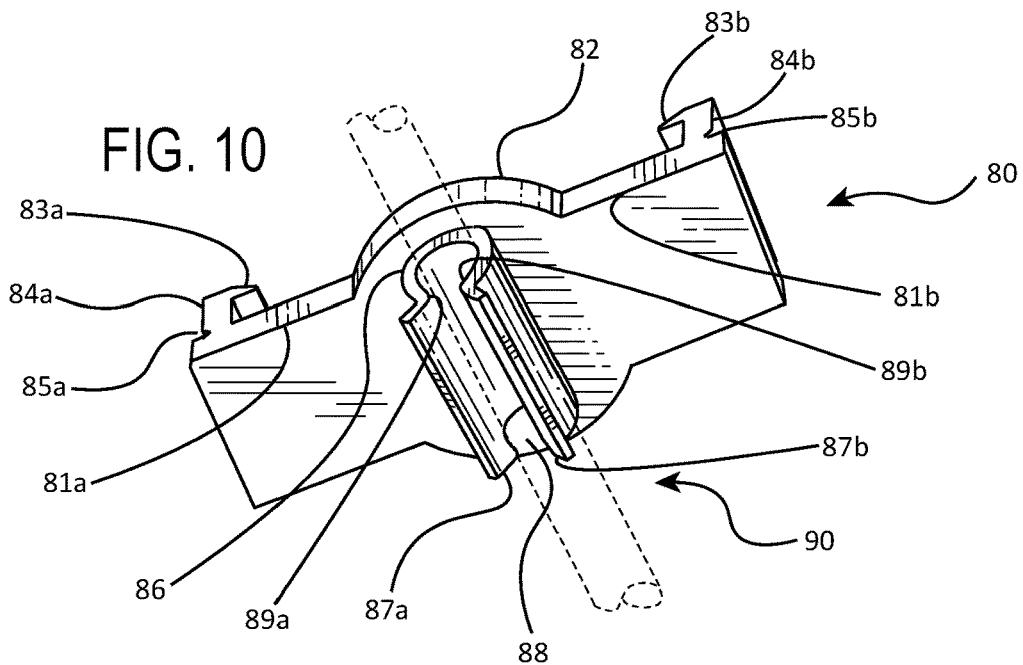
FIG. 10 is a perspective view of an alternate mounting clip for securing a network cable to a ceiling grid.

Also disclosed herein are mounting clips adapted to secure network cable to the lower surface of a ceiling so that the cable can be routed from a network switch or other control equipment to the individual linear LED lamps of an automated lighting system or from one lamp to another. An example of such a network cable mounting clip is shown in FIG. 10, which provides a perspective view of mounting clip 80. The upper portion of mounting clip 80 is the same as the corresponding structure of mounting clip 10 and operates the same way to secure the clip to a channel of a drop ceiling grid. Thus, mounting clip 80 comprises a pair of resilient tabs 84a, 84b extending upwardly from opposite ends of horizontally extending mid-portion 82, and defining slots sized to receive opposite outer edge portions of the ledge of a ceiling grid channel. Inward projecting ramped flanges 83a, 83b of the tabs are configured to oppose the upper surface ledge at the outer edge portions thereof when mounting clip 80 is joined to the channel. The outer sidewalls of tabs 84a, 84b may define grooves 85a, 85b respectively to facilitate outward deflection of the tabs as the mounting clip 80 is moved upward against the ledge of the channel. The mounting clip 80 is secured to the channel in the same manner as previously described with respect to mounting clip 10.

A coupler is adapted to secure a length of network cable to the mounting clip adjacent the underside of the mounting clip. In one aspect, the coupler is in the form of sleeve member 86, which extends along the lower surface of mid-portion 82, as shown. The sleeve member has a generally tubular configuration and defines an internal region sized to receive a network cable through an elongate slot 88, such as the cable 90 shown in fantom. The sleeve member 86 includes opposite wing portions that flair outwardly from corners 89a, 89b adjacent the slot 88. Sleeve member 86 is of a resilient material and its sidewalls flex outwardly to an expanded configuration as the network cable 90 is pressed against the inner sidewalls at the corners and through the slot 88 and into the internal region. The sleeve member returns toward its natural, relaxed configuration once the network cable 90 is seated in the interior region, wrapping around the upper portion and partly around the lower portion of the cable to provide an interference fit to securely hold and restrain the cable within the channel. Additional mounting clips 80 may be used at predetermined intervals along the length of the cable 90 to support the weight of the cable and minimize sagging of the cable. The cable can be removed from the clip 80 by pulling it back through the slot 88.

The mounting clip 80 provides a convenient mechanism for installing network cable on the underside of a ceiling. The clip can be inexpensively manufactured, is easy to install and can be freely positioned as needed to route network cable as needed to connect the various linear LED lamps of a lighting system. The clip can have a relatively small profile of a width only slightly greater than that of the ledge of ceiling grid channels, and may also be provided in a color that matches the color of the ceiling grid channels and/or of the cable for a clean, non-intrusive overall appearance. In one alternative, the upper portion is configured without the upward extending tab portions, similar to that of mounting clip 40 shown in FIG. 9, for applications where the clip is to be flush mounted against a planar support surface using a mechanical fastener or by means of one or more magnets integral to the mid-portion of the mounting clip.

The coupler for grasping the network cable may take various other forms. In one aspect, the coupler comprises at least one pair of spaced resilient fingers extending downwardly from the lower surface of the mid-portion. The fingers deflect outwardly to an expanded assembly configuration as an incident of the network cable moving relative to the mounting clip from a position below and fully separated from the mounting clip upwardly into an engaged position between the fingers. The fingers define an interior region between the fingers sized to receive the network cable and securely retain a portion of the network cable between the fingers.

Figure 11:
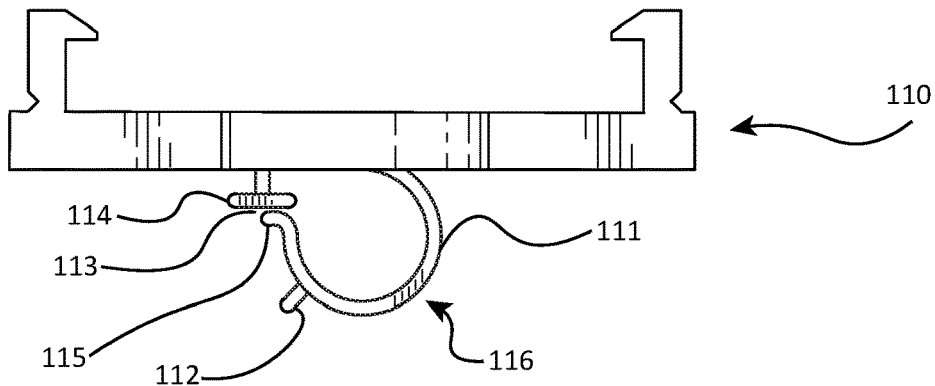
FIG. 11 is a perspective end view of another embodiment of a mounting clip for securing a network cable to a ceiling grid.

FIG. 11 illustrates an alternative mounting clip 110 in which the coupler for holding the network cable is in the form of a clasp mechanism 116, comprising ring member 111 and that interacts with peg 114 protruding from the lower surface of mounting clip. The ring member 111 has a curved profile of a diameter slightly larger than that of the corresponding network cable, and comprises a protruding tip portion 115. A small tab 112 on the external surface of ring member 111 may be used to deform the ring member 111 to an open configuration in which a slot 113 between the tip portion 115 and peg 114 is expanded so that the network cable may be moved into the interior space within the ring member. When the tab 112 is released, the ring member 111 returns to its natural shape and wraps around the cable. The tab 112 is then pushed in the opposite direction to force the tip portion 115 into interlocking engagement with peg 114 to prevent the ring from opening.

Figure 12:
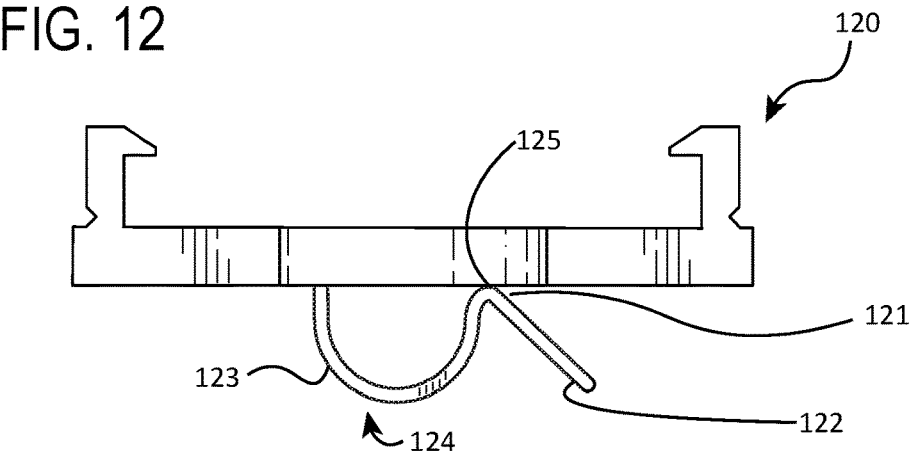
FIG. 12 is a perspective end view of another embodiment of a mounting clip for securing a network cable to a ceiling grid.

FIG. 12 shows another embodiment in the form of mounting clip 120, in which the coupler comprises grasping mechanism 124 having a ring member 123 with elbow 125 that presses against the lower surface of the upper portion of the mounting clip when in its natural shape. Tab 122 extends from the elbow 125 and can be manipulated downward to expand the slot 121 between the elbow 125 and the lower surface so that the network cable may be moved into the interior space within the ring member. When the tab 122 is released, the ring member 123 returns to its natural shape and wraps around the cable.

In another aspect, not illustrated in the drawings, the coupler is in the form of a channel recessed within the mid-portion of the mounting clip and opening towards the bottom surface of the mid-portion. The channel has a main portion of a first width that is slightly greater than the diameter of the cable. A resilient lip extends inwardly along each of the opposite side edges of the channel to define an inlet of the channel having a width slightly smaller than the diameter the network cable. The lip portions deform to permit the network cable to be pressed into the channel and return to their relaxed configuration once the network cable has moved past the lip portions into the main larger width portion of the channel to retain the network cable in the channel. Many other alternative mechanisms may be provided for grasping the network cable, as would be understood by one of ordinary skill in the art based on the disclosure herein.

The lamp and network cable mounting clips in accordance with the principle of the embodiments disclosed herein can be inexpensively be manufactured by injection molding using a suitably strong yet resilient plastic material. For some applications, it may be preferable to form the clips of a metallic material, which may provide a more robust clip for harsh environments or larger and heavier lamps. The material selection and manufacturing technique are considered well within the skill of the art based on the design and operating principles provided herein.

Those skilled in the art will recognize that a wide variety of modifications, alterations, and combinations can be made with respect to the above described embodiments without departing from the spirit and scope of the invention, and that it is intended in the appended claims to cover all those changes and modifications that fall within the true spirit and scope of the present invention.

What is claimed is:

1. A mounting clip for use in securing a linear LED lamp to an overhead dropped ceiling grid, the linear LED lamp comprising an elongate body extending along a first axis between spaced first and second ends and comprising an elongate heat sink formed of a heat dissipating material and comprising ridges disposed on the outer surface thereof and extending along the first axis, and at least one LED emitter panel secured to the heat sink, the mounting clip comprising:
   a planar mid-portion having an upper surface adapted to oppose the lower surface of a horizontally extending ledge of a channel member of the overhead dropped ceiling grid;
   first and second tabs extending upwardly from opposite first and second ends of the mid-portion and comprising respective flanges projecting inwardly toward each other;
   the first and second flanges having respective first and second surfaces, the first and second tabs configured so that the first and second surfaces can be placed in confronting relationship with third and fourth upward facing surfaces of the ledge with the ledge disposed between the tabs to prevent separation of the mounting clip and the channel member as an incident of the mounting clip moving relative to the channel member from a position below and fully separated from the channel member upwardly into an engaged position;

the tab portions configured so that the flanges thereof move against lower outer edge portions of the ledge as the mounting clip is moved upwardly towards the engaged position thereby causing the tab portions to deflect outwardly to an expanded orientation, and the tabs return to a non-expanded orientation with the ledge disposed between the tabs in the engaged position; and a pair of spaced resilient fingers extending downwardly from the first and second ends of the mid-portion and defining an interior region between the fingers sized to receive a portion of the linear LED lamp heat sink;

each finger including a distal end portion comprising an internally facing engagement portion comprising protrusions configured to interlock with one or more of the ridges of the lamp heat sink to thereby securely retain the linear LED lamp between the fingers.

2. The mounting clip according to claim 1, wherein the flanges comprise respective upward facing ramped portions configured to engage the lower outer edge portions of the ledge.

3. The mounting clip according to claim 2, wherein engagement of the ramped portions against the lower outer edge portions of the ledge causes the tab portions to deflect outwardly to the expanded orientation.

4. The mounting clip according to claim 1, wherein an outer surface of each of the first and second tab portions define a horizontally extending groove.

5. The mounting clip according to claim 1, wherein the fingers deflect outwardly from a relaxed orientation to an expanded assembly orientation as an incident of the linear LED lamp moving relative to the mounting clip from a position below and fully separated from the mounting clip upwardly in a path that is traverse to the length of the lamp body into an engaged position between the fingers.

6. The mounting clip according to claim 5, further comprising first and second ribs extending from the mid-portion along inner surfaces of a respective one of the resilient fingers to provide rigidity to the fingers.

7. The mounting clip according to claim 5, wherein the mounting clip is slidable along the ledge of the channel member with the mounting clip in the engaged position and the fingers in the relaxed orientation.

8. The mounting clip according to claim 7, wherein the tab portions rotate inwardly towards each other and against the ledge of the channel member to restrict sliding movement of the mounting clip as the fingers deflect outwardly to the expanded assembly orientation.

9. The mounting clip according to claim 1, wherein the fingers are configured so that the engagement portions thereof can interlock with a linear LED lamp heat sink having a generally circular circumferential geometry.

10. The mounting clip according to claim 1, wherein the fingers are configured so that the engagement portions thereof can interlock with a linear LED lamp heat sink having a generally non-circular circumferential geometry.

* * * * *